US011800582B2

(12) United States Patent
Gu et al.

(10) Patent No.: US 11,800,582 B2
(45) Date of Patent: Oct. 24, 2023

(54) CONNECTION METHOD AND APPARATUS

(71) Applicant: YEALINK (XIAMEN) NETWORK TECHNOLOGY CO., LTD., Fujian (CN)

(72) Inventors: Fuyuan Gu, Fujian (CN); Jiaxiang Chen, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 208 days.

(21) Appl. No.: 17/340,077

(22) Filed: Jun. 6, 2021

(65) Prior Publication Data

US 2022/0338280 A1    Oct. 20, 2022

(30) Foreign Application Priority Data

Apr. 15, 2021    (CN) .............................. 202110403869

(51) Int. Cl.
| | |
|---|---|
| *H04W 76/14* | (2018.01) |
| *H04W 4/029* | (2018.01) |
| *H04W 4/80* | (2018.01) |
| *H04W 12/03* | (2021.01) |
| *H04L 9/40* | (2022.01) |
| *H04L 67/141* | (2022.01) |
| *H04W 84/12* | (2009.01) |

(52) U.S. Cl.
CPC ......... *H04W 76/14* (2018.02); *H04L 63/0428* (2013.01); *H04L 67/141* (2013.01); *H04W 4/029* (2018.02); *H04W 4/80* (2018.02); *H04W 12/03* (2021.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2014/0219194 A1* | 8/2014 | Varoglu | ................ | H04W 36/03 370/329 |
| 2015/0208454 A1* | 7/2015 | Cho | ...................... | H04W 76/14 370/329 |
| 2015/0332211 A1* | 11/2015 | Esfhani | ................ | G06Q 10/087 705/28 |
| 2017/0054727 A1* | 2/2017 | Takemoto | ........... | H04L 63/0876 |
| 2018/0352415 A1* | 12/2018 | Ma | ........................ | H04B 17/318 |
| 2022/0078376 A1* | 3/2022 | Barron | .................... | H04N 7/155 |

* cited by examiner

*Primary Examiner* — Rebecca E Song (57) ABSTRACT

Disclosed are a connection method and apparatus that are applied to a user terminal. The method includes: obtaining positioning information of a host in a conference room, where the positioning information includes an Internet Protocol (IP) address, point to point (P2P) information, and access point (AP) information of the host in the conference room; establishing a local area network (LAN) connection to the host in the conference room based on the IP address; when the LAN connection between the user terminal and the host in the conference room fails to be established, establishing a wireless fidelity (Wi-Fi) P2P network connection to the host in the conference room based on the P2P information; when the Wi-Fi P2P network connection between the user terminal and the host in the conference room fails to be established, establishing an AP-station connection to the host in the conference room based on the AP information.

8 Claims, 3 Drawing Sheets

CONNECTION METHOD AND APPARATUS

CROSS-REFERENCE TO RELATED APPLICATIONS

The present application claims the benefit of Chinese Patent Application No. 202110403869.0 filed on Apr. 15, 2021, the contents of which are hereby incorporated by reference.

TECHNICAL FIELD

The present disclosure relates to the field of communications, and in particular, to a connection method and apparatus.

BACKGROUND

At present, sharing/projecting content in a terminal to a display device in a conference room has become an indispensable link for an enterprise to enhance communication and productivity. Currently, the following problems exist when a connection between the terminal and the display device in the conference room is established:
1. The terminal needs to be manually selected to connect to the display device in the conference room.
2. The connection between the terminal and the display device in the conference room needs to be established based on a local area network (LAN).

SUMMARY

Embodiments of the present disclosure provide a connection method and apparatus, to resolve problems that a terminal needs to be manually selected to connect to a display device in a conference room and a connection between the terminal and the display device in the conference room needs to be established based on a LAN.

A connection method, applied to a user terminal, includes:
  obtaining positioning information of a host in a conference room, where the positioning information includes an Internet Protocol (IP) address, point to point (P2P) information, and access point (AP) information of the host in the conference room;
  establishing a LAN connection to the host in the conference room based on the IP address;
  when the LAN connection between the user terminal and the host in the conference room fails to be established, establishing a wireless fidelity (Wi-Fi) P2P network connection to the host in the conference room based on the P2P information; and
  when the Wi-Fi P2P network connection between the user terminal and the host in the conference room fails to be established, establishing an AP-station connection to the host in the conference room based on the AP information.

Optionally, the step of obtaining positioning information of a host in a conference room includes:
  obtaining the positioning information of the host in the conference room when a positioning apparatus is identified and connected.

Optionally, after the obtaining positioning information of a host in a conference room, the method further includes:
  updating the positioning information of the host in the conference room through near field communication (NFC) broadcasting.

Optionally, the positioning apparatus includes a first Bluetooth obtaining module and/or a first ultrasonic obtaining module, and the step of obtaining positioning information of a host in a conference room includes:
  obtaining the positioning information of the host in the conference room by using the first Bluetooth obtaining module or the first ultrasonic obtaining module.

Optionally, the user terminal is provided with a second Bluetooth obtaining module and/or a second ultrasonic obtaining module, and the step of obtaining positioning information of a host in a conference room includes:
  obtaining the positioning information of the host in the conference room by using the second Bluetooth obtaining module or the second ultrasonic obtaining module.

Optionally, the host in the conference room encrypts the positioning information and broadcasts encrypted positioning information, and after the positioning information broadcast by the host in the conference room is obtained, the method further includes:
  decrypting the positioning information.

A connection apparatus, applied to a user terminal, includes:
  a positioning information obtaining module, configured to obtain positioning information of a host in a conference room, where the positioning information includes an IP address, P2P information, and AP information of the host in the conference room;
  a LAN connection module, configured to establish a LAN connection to the host in the conference room based on the IP address;
  a P2P connection module, configured to: when the LAN connection between the user terminal and the host in the conference room fails to be established, establish a Wi-Fi P2P network connection to the host in the conference room based on the P2P information; and
  an AP-station connection module, configured to: when the Wi-Fi P2P network connection between the user terminal and the host in the conference room fails to be established, establish an AP-station connection to the host in the conference room based on the AP information.

Optionally, the positioning information obtaining module includes:
  a positioning information obtaining submodule, configured to obtain the positioning information of the host in the conference room when a positioning apparatus is identified and connected.

Optionally, the apparatus further includes:
  a positioning information update module, configured to update the positioning information of the host in the conference room through NFC broadcasting.

Optionally, the positioning apparatus includes a first Bluetooth obtaining module and/or a first ultrasonic obtaining module, and the positioning information obtaining submodule includes:
  a first positioning information obtaining subunit, configured to obtain the positioning information of the host in the conference room by using the first Bluetooth obtaining module or the first ultrasonic obtaining module.

The present disclosure has the following advantages:
  In the present disclosure, the positioning information broadcast by the host in the conference room is obtained, where the positioning information includes the IP address, the P2P information, and the AP information of the host in the conference room. The LAN connection to the host in the conference room is established based on the IP address. When the LAN connection between the user terminal and the host in the conference room fails to be established, the Wi-Fi P2P network connection to the host in the conference room is established based on the P2P information. When the Wi-Fi P2P network connection between the user terminal and the host in the conference room fails to be established, the AP-station connection to the host in the conference room is established based on the AP information. In this way, the host in the conference room and the user terminal are connected automatically. When failing to establish a connection based on a LAN, the host in the conference room and the user terminal establish the Wi-Fi P2P connection or the AP-station connection, and can automatically select, based on a user's current system/network environment, a network link for projection, thereby making full use of existing network environment resources of an enterprise.

BRIEF DESCRIPTION OF THE DRAWINGS

To describe the technical solutions in the present disclosure more clearly, the following briefly introduces the accompanying drawings required for describing the present disclosure. Apparently, the accompanying drawings in the following description show merely some embodiments of the present disclosure, and those of ordinary skill in the art may still derive other drawings from these accompanying drawings without creative efforts.

DETAILED DESCRIPTION

To make the above objectives, features, and advantages of the present disclosure more obvious and easy to understand, the present disclosure will be further described in detail with reference to the accompanying drawings and specific implementations. Apparently, the described embodiments are some rather than all of the embodiments of the present disclosure. All other embodiments obtained by those of ordinary skill in the art based on the embodiments of the present disclosure without creative efforts shall fall within the protection scope of the present disclosure.

At present, sharing/projecting content in a notebook computer has become an indispensable link for an enterprise to enhance communication and productivity. Content sharing: also referred to as projection/screen sharing. It means that a user sends/projects content in a computer to another television (TV)/display by using a transmission medium such as a wired or wireless network, so that other people can share/see the content. The content may be screen content, all kinds of multimedia files and documents in the computer, or other information.

Generally, content sharing can be performed by using methods in Table 1. However, the content sharing methods shown in Table 1 have different disadvantages. The content sharing/projection method described in the present disclosure can well avoid defects and limitations of current mainstream content sharing/projection methods.

TABLE 1

| Content sharing method | Description | Disadvantages |
| --- | --- | --- |
| WiDi/Miracast | The method is formulated by the Wi-Fi Alliance, and is a wireless displaying standard based on Wi-Fi Direct. A 3C device supporting the standard can share a video image in a wireless manner. | The method is applicable to Windows 10 notebook computers only. A user needs to manually select a corresponding receiving device. |
| Airplay | The method is a wireless displaying protocol of Apple. It has functions of Miracast and DLNA, and can support screen mirroring, and push streaming media and video uniform resource locators (URLs). At present, both the Mac OS and the iOS are originally provided with the Airplay protocol. | 1. The method can only be used for Apple devices.<br>2. A user needs to manually select a corresponding device.<br>3. The method uses an existing infrastructure network of an enterprise, and this may cause multicast isolation and too many devices in a network segment. Therefore, it is more applicable to a small self-built wireless local area network (WLAN) in a conference room, and is not applicable to an existing LAN of the enterprise. |
| Google Cast | As a wireless displaying protocol of Google, the method can push streaming media, URLs, and control information. Based on a web player, a TV can receive and play video URLs and all kinds of website content, and can also play streaming media from a sending end. At present, the Chrome OS and the Chrome browser support the Google Cast protocol directly. | 1. A user needs to manually select a corresponding device.<br>2. The method uses an existing infrastructure network of an enterprise, and this may cause multicast isolation and too many devices in a network segment. Therefore, it is more applicable to a small self-built WLAN in a conference room, and is not applicable to an existing LAN of the enterprise.<br>3. The protocol does not support personal identification number (PIN) code encryption. |

TABLE 1-continued

| Content sharing method | Description | Disadvantages |
| --- | --- | --- |
| Connecting a projector by using a universal serial bus (USB) interface | A projector with a Wi-Fi module is connected by using a USB interface of a notebook computer, and a network connection to a host in a conference room is established by using the projector. Projection-specific transmission is performed based on the network connection. | Costs of the Wi-Fi module are relatively high. An existing infrastructure network of an enterprise cannot be used well. |
| Projection performed by software based on an IP address/a server protection code | A server delivers a randomly generated pairing code to each host, and a user independently inputs the pairing code on an App for projection. An NFC technology such as ultrasonic/BLE is used to transmit the pairing code, and this can realize one-touch projection with no input. The server is introduced, so that whether the host and the user are in a same LAN can be determined. If they are not in the same LAN, the server can also deliver the pairing code for projection. | 1. A user needs to install an additional App, and needs to develop use habits. 2. The host needs to be connected to the Internet. 3. A computer may be incompatible with NFC (ultrasonic/Bluetooth). |

Figure 1:
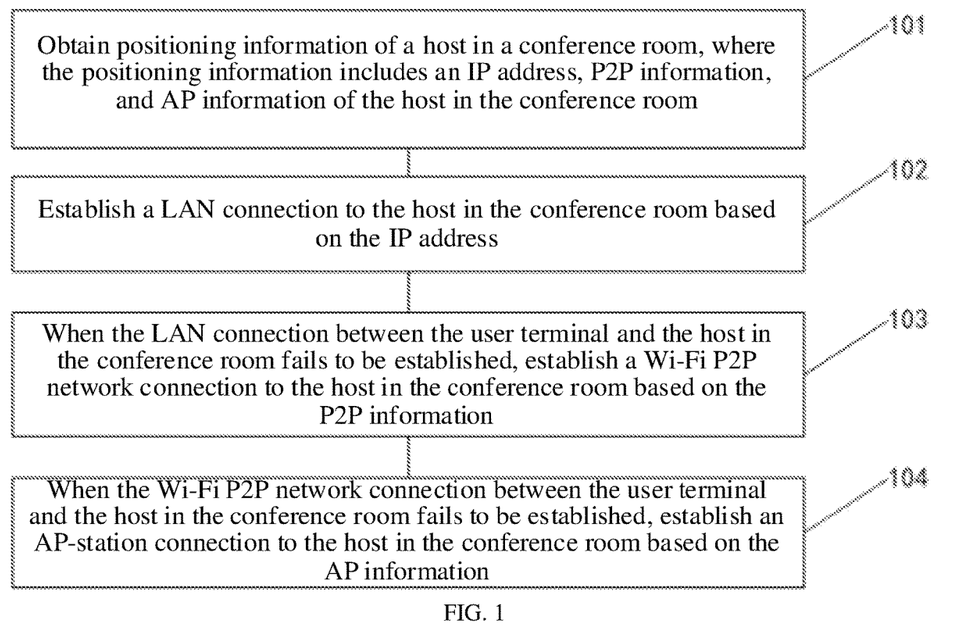
FIG. 1 is a flowchart of a connection method according to an embodiment of the present disclosure.

To resolve the above problem, an embodiment of the present disclosure provides a connection method. A flowchart of the connection method is shown in FIG. 1. The connection method is applied to a user terminal. The user terminal may be a computer composed of a hardware system and a software system. The computer is essentially an electronic computing machine for high-speed computing, and may be a personal notebook computer, a desktop computer, a server workstation, or the like.

Specifically, the connection method may include the following steps.

Step 101: Obtain positioning information of a host in a conference room, where the positioning information includes an IP address, P2P information, and AP information of the host in the conference room. The AP information includes a service set identifier (SSID) and a password of the SSID. The P2P information includes a PIN code and a password of the PIN. Whether a username and a password are needed can be determined based on a setting of the host in the conference room. The positioning information may be written by the host in the conference room when a positioning apparatus and the host in the conference room are connected, or may be burned in advance before delivery. In addition, the positioning information can be updated through NFC broadcasting, such as Bluetooth or ultrasonic, by the host in the conference room. For example, when the positioning apparatus and the host in the conference room are connected by using a USB interface, the host in the conference room writes the positioning information into the positioning apparatus. Broadcasting is to transmit information by using a radio wave or transmit a sound by using a wire. Transmitting a program by using a radio wave is referred to as wireless broadcasting, and transmitting a program by using a wire is referred to as wired broadcasting.

The host in the conference room may also be referred to as a hub host, a projection box, or the like. The host in the conference room is configured to receive all kinds of multimedia content, documents, and other information that are transmitted by a user, and then transmit, to a hardware device of a display, the content transmitted by the user. The host in the conference room is a bridge between a user computer and a display device. The device may convert a format of data content transmitted by the user computer, so that the data content can be displayed on the display correctly. The display may also be referred to as a TV, a monitor, or the like. The display is a displaying tool that displays a given electronic file on a screen by using a specific transmission device, and then reflects the electronic file to human eyes.

Figure 2:
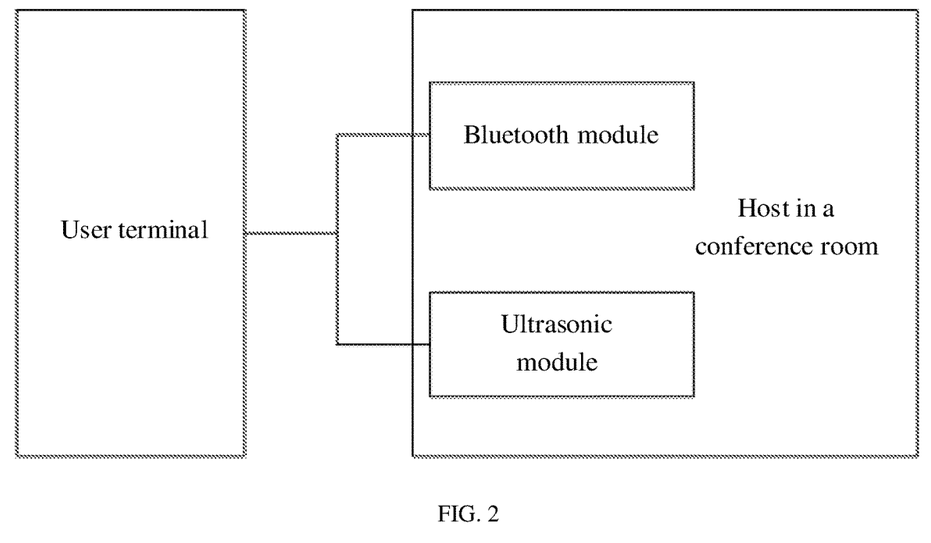
FIG. 2 is a schematic diagram of a connection system according to an embodiment of the present disclosure.

After a preset projection mode is enabled, the host in the conference room can determine whether there is a connection to the user terminal. If there is no connection to the user terminal, the host in the conference room broadcasts the positioning information every preset time, and determines whether there is a connection to the user terminal. As shown in FIG. 2, the host in the conference room can broadcast, through Bluetooth, beacon and ultrasonic, the IP address, the P2P information, and the AP information of the host in the conference room after encrypting them. The AP information includes the SSID and the password of the SSID, and the P2P information includes the PIN and the password of the PIN. Encrypted positioning information is decrypted for establishing a connection between the host in the conference room and a sharing device. Herein, the encrypted positioning information may be decrypted by running software on the sharing device after being received by the sharing device, and then used to configure the sharing device; or preferably, may be decrypted by the positioning apparatus.

Figure 3:
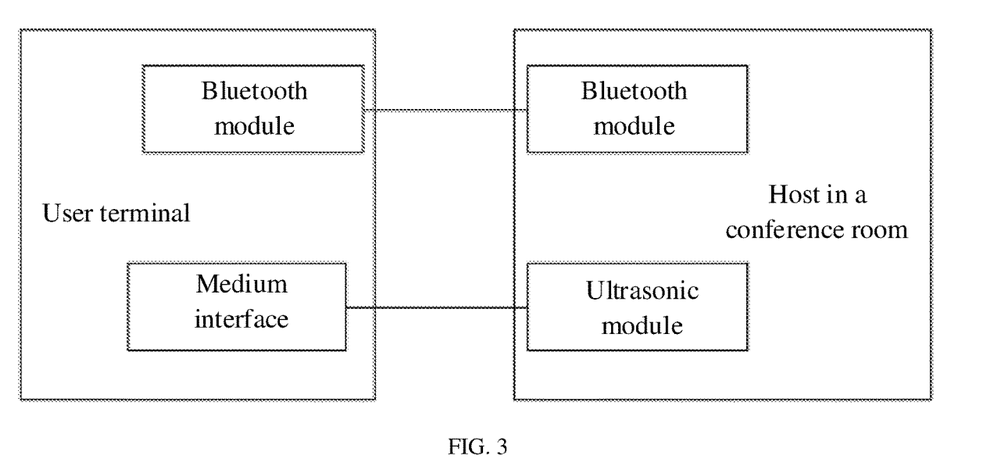
FIG. 3 is a schematic diagram of another connection system according to an embodiment of the present disclosure.

During conference projection, the user terminal may extract and update the positioning information from a broadcast message sent by the host in the conference room through NFC such as Bluetooth or ultrasonic, so that the user terminal can know the positioning information no matter how some variable information (such as the IP address/Wi-Fi information) of the host in the conference room changes. As shown in FIG. 3, the user terminal may alternatively extract, by using a module such as Bluetooth or a medium interface connector of the user terminal, the positioning information from the broadcast message sent by the host in the conference room through NFC such as Bluetooth or ultrasonic.

Step 102: Establish a LAN connection to the host in the conference room based on the IP address.

After obtaining the IP address in the positioning information broadcast by the host in the conference room, the user terminal sends a connection request to the IP address in a LAN, and establishes the LAN connection to the host in the conference room based on the IP address.

Step 103: When the LAN connection between the user terminal and the host in the conference room fails to be established, establish a Wi-Fi P2P network connection to the host in the conference room based on the P2P information.

Wi-Fi P2P is another important technical specification launched by the Wi-Fi Alliance. A trade name of Wi-Fi P2P is Wi-Fi Direct. Wi-Fi Direct allows devices in a wireless network to connect to each other in a P2P mode without using an AP. Similar to the Bluetooth technology, Wi-Fi P2P allows wireless devices to connect to each other in the P2P mode. In addition, Wi-Fi P2P improves a transmission speed and a transmission distance compared with the Bluetooth technology.

When the LAN connection between the user terminal and the host in the conference room is successfully established, in response to the connection request, the host in the conference room may send a connection success feedback to the user terminal. When the user terminal does not receive the connection success feedback within a preset time, the LAN connection between the user terminal and the host in the conference room fails to be established. In this case, the user terminal can establish the Wi-Fi P2P network connection to the host in the conference room based on the P2P information.

Step 104: When the Wi-Fi P2P network connection between the user terminal and the host in the conference room fails to be established, establish an AP-station connection to the host in the conference room based on the AP information.

In this specification, in an AP-station mode, a traditional client is directly connected to an AP in a station (STA) mode. A STA is generally a client in a WLAN, may be a computer with a wireless network card, or a smart phone with a Wi-Fi module, and may be mobile or fixed. In a process of establishing a link between the STA and the AP, after obtaining available service set identifiers (SSIDs) through scanning by using a beacon frame or a probe response frame, the STA selects, based on a received signal strength indication (RSSI) of the received beacon frame or probe response frame, an appropriate SSID for access.

When the Wi-Fi P2P network connection between the user terminal and the host in the conference room is successfully established, in response to the connection request, the host in the conference room may send a connection success feedback to the user terminal. When the user terminal does not receive the connection success feedback within a preset time, the Wi-Fi P2P network connection between the user terminal and the host in the conference room fails to be established. In this case, the user terminal can establish the AP-station connection to the host in the conference room based on the AP information.

In the present disclosure, the positioning information broadcast by the host in the conference room is obtained. The positioning information includes the IP address, the P2P information, and the AP information of the host in the conference room. The AP information includes the SSID and the password of the SSID, and the P2P information includes the PIN and the password of the PIN. Whether the username and the password are needed can be determined based on a setting of the host in the conference room. The positioning information may be written by the host in the conference room when the positioning apparatus and the host in the conference room are connected, or may be burned in advance before delivery. In addition, the positioning information can be updated through NFC broadcasting, such as Bluetooth or ultrasonic, by the host in the conference room. For example, when the positioning apparatus and the host in the conference room are connected by using the USB interface, the host in the conference room writes the positioning information into the positioning apparatus. The LAN connection to the host in the conference room is established based on the IP address. When the LAN connection between the user terminal and the host in the conference room fails to be established, the Wi-Fi P2P network connection to the host in the conference room is established based on the PIN and the password of the PIN. When the Wi-Fi P2P network connection between the user terminal and the host in the conference room fails to be established, the AP-station connection to the host in the conference room is established based on the SSID and the password of the SSID. In this way, the host in the conference room and the user terminal are connected automatically. When failing to establish a connection based on the LAN, the host in the conference room and the user terminal establish the Wi-Fi P2P connection or the AP-station connection, and can automatically select a network link for projection, based on a user's current system/network environment, thereby making full use of existing network environment resources of an enterprise and being compatible with any computer and operating system of the user.

Figure 4:
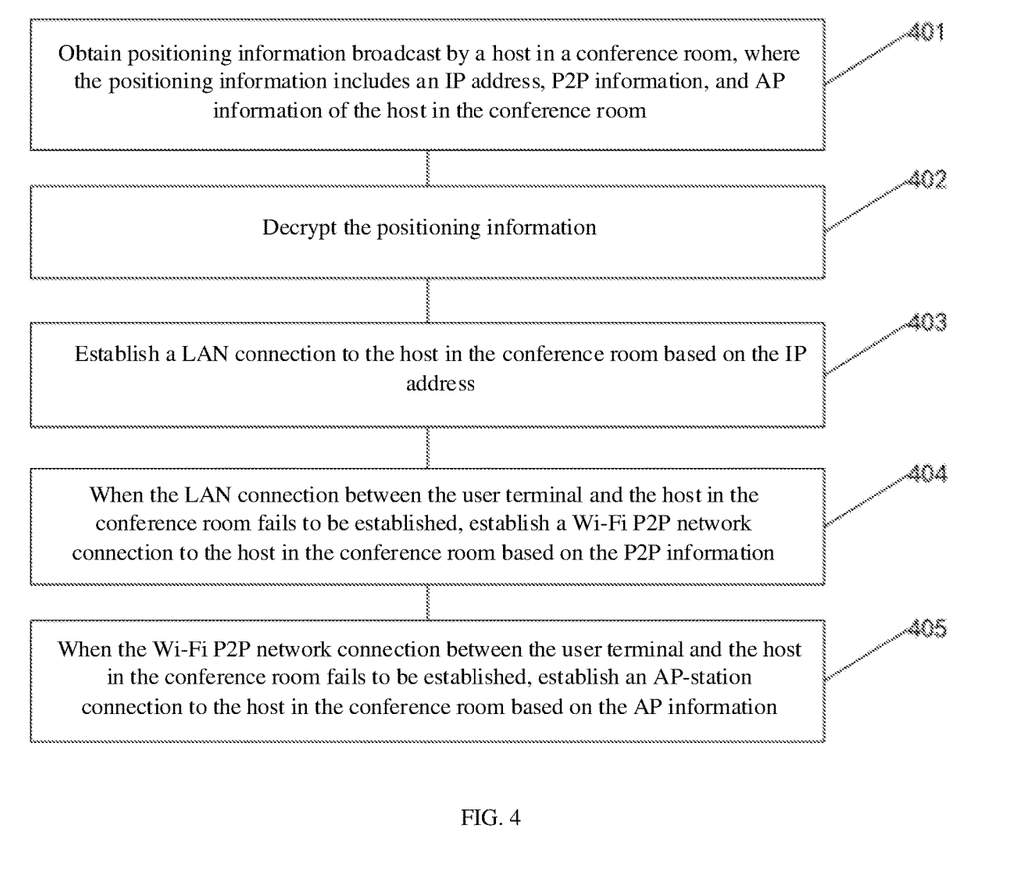
FIG. 4 is a flowchart of another connection method according to an embodiment of the present disclosure.

To resolve the above problem, an embodiment of the present disclosure provides another connection method. A flowchart of the connection method is shown in FIG. 4. The connection method is applied to a user terminal, and a host in a conference room is configured to encrypt positioning information. Specifically, the connection method may include the following steps.

Step 401: Obtain the positioning information broadcast by the host in the conference room, where the positioning information includes an IP address, P2P information, and AP information of the host in the conference room.

In an embodiment of the present disclosure, the step of obtaining the positioning information of the host in the conference room includes:

obtaining the positioning information of the host in the conference room when a positioning apparatus is identified and connected.

The positioning apparatus is a hardware apparatus for locating a position of the host in the conference room. This apparatus may be connected to a user computer by using a USB interface, to transmit related information of the host in the conference room to projection software. The projection software can transmit to-be-shared content to the correct host in the conference room by a transmission medium such as a network, only after knowing the correct position of the host in the conference room. The positioning apparatus may first write the positioning information of the host in the conference room, including the IP address, the P2P information, and the AP information, through methods such as pairing or factory prefabrication. In an embodiment of the present disclosure, the positioning apparatus includes a first Bluetooth obtaining module and/or a first ultrasonic obtaining module, and the step 401 includes:

obtaining the positioning information of the host in the conference room by using the first Bluetooth obtaining module or the first ultrasonic obtaining module.

In an embodiment of the present disclosure, the user terminal is provided with a second Bluetooth obtaining module and/or a second ultrasonic obtaining module, and the step 401 includes:

obtaining the positioning information of the host in the conference room by using the second Bluetooth obtaining module or the second ultrasonic obtaining module.

Step 402: Decrypt the positioning information.

Step 403: Establish a LAN connection to the host in the conference room based on the IP address.

Step 404: When the LAN connection between the user terminal and the host in the conference room fails to be established, establish a Wi-Fi P2P network connection to the host in the conference room based on the P2P information.

Step 405: When the Wi-Fi P2P network connection between the user terminal and the host in the conference room fails to be established, establish an AP-station connection to the host in the conference room based on the AP information.

In the present disclosure, the connection between the user terminal and the host in the conference room can be established by using the positioning apparatus. An application program can be preset in the positioning apparatus, and is plug and play. The operation is simple, and the user does not need to manually install any application program in the user terminal.

It should be noted that, for the sake of simplicity, the foregoing method embodiments are described as a series of action combinations, but persons skilled in the art will recognize that the embodiments of the present disclosure are not limited by the sequence of actions described, and certain steps may be performed in another order or at the same time according to the embodiments of the present disclosure. In addition, it should be understood by persons skilled in the art that the embodiments described in this specification are preferred embodiments and the related actions are not necessarily necessary for the embodiments of the present disclosure.

Figure 5:
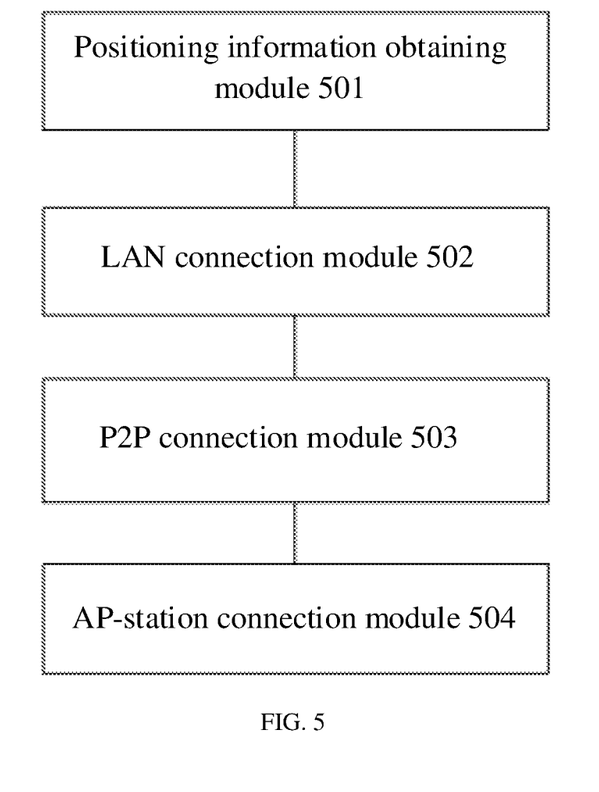
FIG. 5 is a structural block diagram of a connection apparatus according to an embodiment of the present disclosure.

FIG. 5 is a structural block diagram of a connection apparatus according to an embodiment of the present disclosure. Specifically, the connection apparatus may include:
- a positioning information obtaining module 501, configured to obtain positioning information broadcast by a host in a conference room, where the positioning information includes an IP address, P2P information, and AP information of the host in the conference room;
- a LAN connection module 502, configured to establish a LAN connection to the host in the conference room based on the IP address;
- a P2P connection module 503, configured to: when the LAN connection between a user terminal and the host in the conference room fails to be established, establish a Wi-Fi P2P network connection to the host in the conference room based on the P2P information; and
- an AP-station connection module 504, configured to: when the Wi-Fi P2P network connection between the user terminal and the host in the conference room fails to be established, establish an AP-station connection to the host in the conference room based on the AP information.

In an embodiment of the present disclosure, the positioning information obtaining module 501 includes:
a positioning information obtaining submodule, configured to obtain the positioning information of the host in the conference room when a positioning apparatus is identified and connected.

In an embodiment of the present disclosure, the apparatus further includes:
a positioning information update module, configured to update the positioning information of the host in the conference room through NFC broadcasting.

In an embodiment of the present disclosure, the positioning apparatus includes a first Bluetooth obtaining module and/or a first ultrasonic obtaining module, and the positioning information obtaining submodule includes:
a first positioning information obtaining subunit, configured to obtain the positioning information of the host in the conference room by using the first Bluetooth obtaining module or the first ultrasonic obtaining module.

In an embodiment of the present disclosure, the user terminal is provided with a second Bluetooth obtaining module and/or a second ultrasonic obtaining module, and the positioning information obtaining submodule includes:
a second positioning information obtaining subunit, configured to obtain the positioning information of the host in the conference room by using the second Bluetooth obtaining module or the second ultrasonic obtaining module.

In an embodiment of the present disclosure, the host in the conference room is configured to encrypt the positioning information and broadcast encrypted positioning information, and the apparatus further includes:
a positioning information decryption module, configured to decrypt the positioning information.

In this embodiment of the present disclosure, the positioning information obtaining module is one or more processors or chips that have a communication interface and can implement a communication protocol. If required, the positioning information obtaining module may further include a memory, a related interface, a related system transmission bus, and the like. The LAN connection module is one or more processors or chips that have a communication interface and can implement a communication protocol. The P2P connection module is one or more processors or chips that have a communication interface and can implement a communication protocol. The AP-station connection module is one or more processors or chips that have a communication interface and can implement a communication protocol. The positioning information obtaining submodule is one or more processors or chips that have a communication interface and can implement a communication protocol. The positioning information update module is one or more processors or chips that have a communication interface and can implement a communication protocol. The first Bluetooth obtaining module is one or more processors or chips that have a communication interface and can implement a Bluetooth communication protocol. If required, the first Bluetooth obtaining module may further include a memory, a related interface, a related system transmission bus, and the like. The first ultrasonic obtaining module is one or more processors or chips that have a communication interface and can implement an ultrasonic communication protocol. If required, the first ultrasonic obtaining module may further include a memory, a related interface, a related system transmission bus, and the like. The first positioning information obtaining subunit or the second positioning information obtaining subunit is one or more processors or chips that have a communication interface and can implement a communication protocol. The second Bluetooth obtaining module is one or more processors or chips that have a communication interface and can implement a Bluetooth communication protocol. If required, the second Bluetooth obtaining module may further include a memory, a related interface, a related system transmission bus, and the like. The second ultrasonic obtaining module is one or more processors or chips that have a communication interface and can implement an ultrasonic communication protocol. If required, the second ultrasonic obtaining module may further include a memory, a related interface, a related system transmission bus, and the like. The processor or the chip executes related code of a program to implement a corresponding function.

For the system embodiment, since it corresponds to the method embodiment, the description is relatively simple, and reference can be made to the description of the method embodiment.

An embodiment of the present disclosure further provides an electronic device. The electronic device may include a processor, a memory, and a computer program that is stored in the memory and can run on the processor. The computer program is executed by the processor to perform the steps of the above connection method.

An embodiment of the present disclosure further provides a computer-readable storage medium. The computer-readable storage medium stores a computer program. The computer program is executed by a processor to perform the steps of the above connection method.

The embodiments of this specification are described in a progressive manner. Each embodiment focuses on the difference from other embodiments, and the same and similar parts between the embodiments may refer to each other.

Those skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the embodiments of the present disclosure may use a form of a computer program product that is implemented on one or more computer-usable storage media (including but not limited to a disk memory, a CD-ROM, an optical memory, and the like) that include computer-usable program codes.

The embodiments of the present disclosure are described with reference to the flowcharts and/or block diagrams of the method, the terminal device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing terminal device to generate a machine, so that the instructions executed by a computer or a processor of another programmable data processing terminal device generate an apparatus for implementing a specific function in one or more processes in the flowcharts and/or in one or more blocks in the block diagrams.

These computer program instructions may also be stored in a computer-readable memory that can instruct a computer or another programmable data processing terminal device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing terminal device, so that a series of operations and steps are performed on the computer or the another programmable terminal device, thereby generating computer-implemented processing. Therefore, the instructions executed on the computer or the another programmable terminal device provide steps for implementing a specific function in one or more processes in the flowcharts and/or in one or more blocks in the block diagrams.

Although preferred embodiments of the present disclosure have been described, persons skilled in the art can make changes and modifications to these embodiments once they learn the basic inventive concept. Therefore, the appended claims are intended to be construed as covering the preferred embodiments and all changes and modifications falling within the scope of the embodiments of the present disclosure.

Finally, it should be further noted that, in this specification, relationship terms such as first and second are only used to distinguish an entity or operation from another entity or operation, but do not necessarily require or imply that there is any actual relationship or order between these entities or operations. Moreover, the terms "include", "comprise" or any other variants thereof are intended to cover non-exclusive inclusion, so that a process, method, article or terminal device including a series of elements not only includes those elements, but also includes those elements that are not explicitly listed, or also includes elements inherent to this process, method, article or terminal device. Without more restrictions, the elements defined by the sentence "including a . . . " do not exclude the existence of other identical elements in the process, method, article, or terminal device including the elements.

The connection method and apparatus provided in the present disclosure are described above in detail. Several embodiments are used for illustration of the principles and implementations of the present disclosure. The description of these embodiments is only used to help illustrate the method and its core principles of the present disclosure. In addition, those of ordinary skill in the art can make various modifications in terms of specific implementations and scope of application in accordance with the ideas of the present disclosure. In conclusion, the content of this specification shall not be construed as a limitation to the present disclosure.

The invention claimed is:

1. A connection method, applied to a user terminal, wherein the method comprises:
 obtaining positioning information of a host in a conference room, wherein the positioning information comprises an Internet Protocol (IP) address, point to point (P2P) information, and access point (AP) information of the host in the conference room;
 establishing a local area network (LAN) connection to the host in the conference room based on the IP address;
 when the LAN connection between the user terminal and the host in the conference room fails to be established, establishing a wireless fidelity (Wi-Fi) P2P network connection to the host in the conference room based on the P2P information; and
 when the Wi-Fi P2P network connection between the user terminal and the host in the conference room fails to be established, establishing an AP-station connection to the host in the conference room based on the AP information;
 wherein after the obtaining positioning information of a host in a conference room, the method further comprises:

updating the positioning information of the host in the conference room through near field communication (NFC) broadcasting.

2. The connection method according to claim 1, wherein the step of obtaining positioning information of a host in a conference room comprises:
 obtaining the positioning information of the host in the conference room when a positioning apparatus is identified and connected.

3. The connection method according to claim 2, wherein the positioning apparatus comprises a first Bluetooth obtaining module and/or a first ultrasonic obtaining module, and the step of obtaining positioning information of a host in a conference room comprises:
 obtaining the positioning information of the host in the conference room by using the first Bluetooth obtaining module or the first ultrasonic obtaining module.

4. The connection method according to claim 1, wherein the user terminal is provided with a second Bluetooth obtaining module and/or a second ultrasonic obtaining module, and the step of obtaining positioning information of a host in a conference room comprises:
 obtaining the positioning information of the host in the conference room by using the second Bluetooth obtaining module or the second ultrasonic obtaining module.

5. The connection method according to claim 1, wherein the host in the conference room encrypts the positioning information and broadcasts encrypted positioning information, and after the positioning information broadcast by the host in the conference room is obtained, the method further comprises:
 decrypting the positioning information.

6. A connection apparatus of a user terminal, wherein the connection apparatus comprises:
 a positioning information obtaining module, configured to obtain positioning information of a host in a conference room, wherein the positioning information comprises an IP address, P2P information, and AP information of the host in the conference room;
 a LAN connection module, configured to establish a LAN connection to the host in the conference room based on the IP address;
 a P2P connection module, configured to: when the LAN connection between the user terminal and the host in the conference room fails to be established, establish a Wi-Fi P2P network connection to the host in the conference room based on the P2P information; and
 an AP-station connection module, configured to: when the Wi-Fi P2P network connection between the user terminal and the host in the conference room fails to be established, establish an AP-station connection to the host in the conference room based on the AP information;
 a positioning information update module, configured to update the positioning information of the host in the conference room through NFC broadcasting.

7. The connection apparatus according to claim 6, wherein the positioning information obtaining module comprises:
 a positioning information obtaining submodule, configured to obtain the positioning information of the host in the conference room when a positioning apparatus is identified and connected.

8. The connection apparatus according to claim 7, wherein the positioning apparatus comprises a first Bluetooth obtaining module and/or a first ultrasonic obtaining module, and the positioning information obtaining submodule comprises:
 a first positioning information obtaining subunit, configured to obtain the positioning information of the host in the conference room by using the first Bluetooth obtaining module or the first ultrasonic obtaining module.

* * * * *